March 5, 1963

L. D. McALLISTER 3,080,103

COMPRESSORS

Filed Sept. 15, 1958

Fig. 1

Fig. 2

INVENTOR
L. D. McAllister

ATTORNEYS

United States Patent Office 3,080,103
Patented Mar. 5, 1963

3,080,103
COMPRESSORS
L. D. McAllister, Greenville, Mich., assignor to Hupp Corporation, Cleveland, Ohio, a corporation of Virginia
Filed Sept. 15, 1958, Ser. No. 761,156
2 Claims. (Cl. 230—17)

This invention relates to compressors and more particularly to automatic safety devices for electrically driven compressors of the type used in refrigeration systems.

Generally, compressors of this type together with their drive motors are mounted in a hermetically sealed shell in which a large portion of the heat is produced by the compressor and its motor is retained. In order to protect the motor windings against excessive heat, heat responsive circuit breakers are provided to interrupt the motor circuit when excessive heat is detected by the circuit breakers. Usually the circuit breakers are mounted on the outside of the compressor housing and accordingly receive heat from the compressor by conduction and radiation which augments the heat developed by the circuit breaker itself by the use of windings in series with the motor circuit. The circuit breakers are provided primarily to protect the motor windings from damage which results from continued operation under periods of extreme load or under "locked-rotor" conditions when the rotor is completely stopped or blocked.

As is well known in the art, a reduction in the voltage supplied to the motor is accompanied by corresponding rise in the magnetization current which produces an increase in the temperature of the motor windings. Ordinarily the motor will operate within safe temperature limits even when the voltage supplied is 10% under rated voltage. It is desired to have the motor compressor operate without interruption under these conditions. This result can be accomplished by having a thermal protective device with enough capacity to carry the current drawn under the low voltage condition and with enough added capacity to withstand the heat radiated into the device from the compressor housing. Thus these conditions determine the lowest protector rating which can be used for optimum running conditions. However a protector capacity determined in this manner permits the attainment of excessive temperatures in the winding of the motor under periods of extreme load or under "locked rotor" conditions. Accordingly, a thermal protector having a smaller capacity than that required for normal operation must be used with the result that the protector circuit breaker may be tripped although the motor winding itself is at safe operating temperature. Accordingly, prior to the present invention, the compressors were subject to frequent nuisance trip outs caused by moderately heavy loads and high environmental temperatures at times when the air conditioner or other cooling system is needed most.

It is a principal purpose and object of the present invention to provide improved circuit breaker installations for protecting the motor windings of a motor-compressor unit which overcome the above-stated disadvantages of the prior systems and provide for full protection against damage caused by excessive current flow during locked rotor conditions and yet which avoid unnecessary interruption of the operation of the compressor. This principal object and other subordinate objects are accomplished in the present invention by creating an artificially cooled environment for the temperature responsive circuit breaker during periods of normal operation and discontinuing the artificial cooling effect when the compressor stops for any reason or during locked rotor condition. In accordance with the preferred form of the invention, the cooling effect is obtained by directing the flow of relatively cool refrigerant returning to the compressor from the suction side of the evaporator to an area immediately adjacent the temperature responsive circuit breaker.

Accordingly the present invention, by cooling the area of the compressor shell where the thermal protector is attached, makes it unnecessary to incorporate any added capacity in the protector to withstand radiated heat during normal operation. This permits the use of the lowest possible thermal protector rating since the thermal protector senses both the current demand and the radiated heat to trip out more rapidly and remain off longer under locked rotor conditions. The shorter "on time" and longer "off time" consequently reduces each current input pulse and allows a substantially longer time for heat to be dissipated from the compressor before the compressor motor is again operated and the windings of the motor will stabilize at lower temperatures.

Thus it is a more specific object of the present invention to provide apparatus for reducing the temperature of the environment of the heat responsive circuit breaker for a compressor during normal compressor operation without reducing the desired protective effect of environmental heat when the compressor is stopped.

It is a further object to provide apparatus of the character described which is simple in structure, which can be incorporated at relatively low expense and without requiring redesign of any of the major compressor components.

Additional objects and advantages will become apparent as the description proceeds in connection with the accompanying drawings in which:

FIGURE 1 is a top plan view of a motor-compressor unit embodying a preferred form of the present invention, a portion of the housing being broken away to show interior detail; and FIGURE 2 is a side elevation of the apparatus of FIGURE 1.

Referring now more particularly to the drawings, the basic components of the compressor assembly indicated generally at 10 are of essentially conventional construction. The motor-compressor unit per se is indicated at 12 and comprises an upper motor section 14 which supports the compressor 16 at its lower end. The entire motor compressor unit is mounted on three spring assemblies 18 supported by brackets 20 rigid with a lower mounting shell 22. This lower shell 22 is provided with any suitable number of mounting feet 24 to permit the installation of the unit as required. The entire unit is hermetically sealed by an upper shell 26, the upper and lower shells being welded or otherwise sealingly secured around the entire length of their peripheral flange portions 28 and 30.

As is well known in the art, when a unit of this type is installed in a refrigerator, air conditioner or similar system, it is connected to receive refrigerant from one side of the evaporator to compress the refrigerant and to deliver the compressed refrigerant to a condenser. Details of the associated system have been omitted since they form no part of the present invention.

The motor 14 is cycled on and off by a thermostat positioned in the room or other space cooled by the unit. Also in series with the motor is a heat sensitive overload circuit breaker 42.

In order to make the unit directly sensitive to the immediate compressor environment, it is mounted on the exterior of the upper shell 26.

The circuit breaker is, in all respects, of conventional construction and is a standard commercially available part. In general the unit includes a switch in series with the motor, the switch being operated by a bi-metallic member or other temperature sensitive member. The heat which controls the operation of the switch is derived from windings in series with the motor windings which become heated as the motor current increases. The unit is also, of course, heated by conduction and radiation from the compressor shell itself and by the ambient air surrounding the unit externally of the compressor shell. The series electrical connection of the unit to the motor 14 is in all respects conventional and need not be discussed in detail for present purposes.

The refrigerant discharge line leading from the compressor unit to the exterior of the shell for connection to a line leading to the condenser is indicated at 32. While it is necessary to connect the discharge line 32 directly to the output side of the compressor, the inlet refrigerant line 34 leads to the interior of the sealed housing. In accordance with the present invention, the refrigerant inlet line 34 is provided with an external vertical portion 37 adapted to be connected to a line leading to one side of the evaporator and an internal section 38 which, as best shown in FIGURE 1, is smoothly curved so that its terminal portion 40 is closely adjacent the inner surface of the portion of the shell 26 to which the temperature sensitive circuit breaker assembly 42 is attached. Accordingly, the circuit breaker is, during normal operation of the unit, constantly being cooled by the flow of refrigerant to prevent operation of the circuit breaker under conditions where the motor windings are at a safe operating temperature but where the current is at or near allowable maximums and the combined effects of conduction and radiation and the ambient temperature is sufficient when added to the temperature developed within the circuit breaker unit itself to cause the unit to open the motor circuit.

Actual experience has demonstrated the effectiveness of this construction. In one specific case it permitted the motor to run nine minutes at 101 volts and 12½ amps. Under these conditions the temperature of the shell in the area of the overload switch was 132° and the overload ambient temperature was 138° and the motor was operating at a safe temperature. In comparable prior apparatus omitting the artificial cooling system of the present invention, the temperature of the shell in the area adjacent the overload switch was 178° and the ambient temperature within the housing enclosing the overload switch was 158° at 101 volts. Effective locked rotor protection could not be obtained without causing overload trip at 107–110 volts.

Thus the cooling system of the present invention has converted the conventional overload switch to selective operation so that it is caused to trip only under conditions which indicate a true overheating of the motor which it protects.

It will be apparent from the foregoing that heat generated from the motor windings and other heat generating elements in the compressor would, under heavy load low voltage conditions, cause trip outs at a time when the cooling capacity of the air conditioner is needed most critically. Such heat generating conditions are compensated for by cooling the switch environment as long as the compressor is functioning. However under locked rotor conditions when the motor is stopped by excessive load, the cold gas impact stops and the heat of the system quickly asserts itself in the environment of the heat sensitive circuit breaker and opens the motor circuit. This system in effect permits the mounting of the heat-sensitive circuit breaker on the compressor dome at a point which closely follows the temperature of the motor windings and yet which effectively thermally isolates the circuit breaker during normal operation. It will be noted that after the circuit breaker opens because of a locked rotor condition, heat radiates from the compressor and the motor windings into the circuit breaker and keeps it from re-setting longer since it does not cool as rapidly as it would if remotely mounted. Thus the motor windings also cool down, being "off" a longer time and "on" a shorter time as the circuit breaker cycles. The protection for the unit is thus increased while the range of normal operation is extended considerably.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a compressor assembly for a refrigeration system, a sealed shell-like housing, a compressor and an electric drive motor mounted in said housing to provide a space between said motor and the interior of said housing, an electric control circuit for said motor, inlet and outlet conduits for conducting refrigerant to and from said shell-like housing respectively, a thermal-overload switch mounted on the exterior of said housing and covering a predetermined area of said housing, said switch being connected to open said circuit when heated above a predetermined temperature, and means forming a terminal portion of said inlet conduit directed through said space toward and adjacent to the inner surface of said predetermined area of said housing to thereby normally maintain said switch below said predetermined temperature.

2. In a compressor assembly for a refrigeration system, a sealed shell-like housing, a unitary electric motor-compressor assembly, an electric control circuit for said motor, spring means mounting said motor-compressor assembly in said housing to provide a space between said motor and said housing, inlet and outlet conduits for conducting refrigerant to and from said shell-like housing respectively, a thermal-overload switch mounted on the exterior of said housing opposite said space, said switch covering a predetermined area of said housing, said switch being connected to open said circuit when heated above a predetermined temperature and said inlet conduit having an outlet positioned within said space and adjacent to the inner surface of said predetermined area of said housing and being effective to direct a stream of cool refrigerant to said predetermined area of said housing to thereby normally maintain said switch below said predetermined temperature.

References Cited in the file of this patent
UNITED STATES PATENTS

| | | |
|---|---|---|
| 2,283,024 | Wolfert | May 12, 1942 |
| 2,483,007 | Higham | Sept. 27, 1949 |
| 2,518,597 | Brooks | Aug. 15, 1950 |
| 2,628,016 | Higham | Feb. 10, 1953 |
| 2,811,019 | Courtney | Oct. 29, 1957 |